United States Patent Office 3,099,277
Patented July 30, 1963

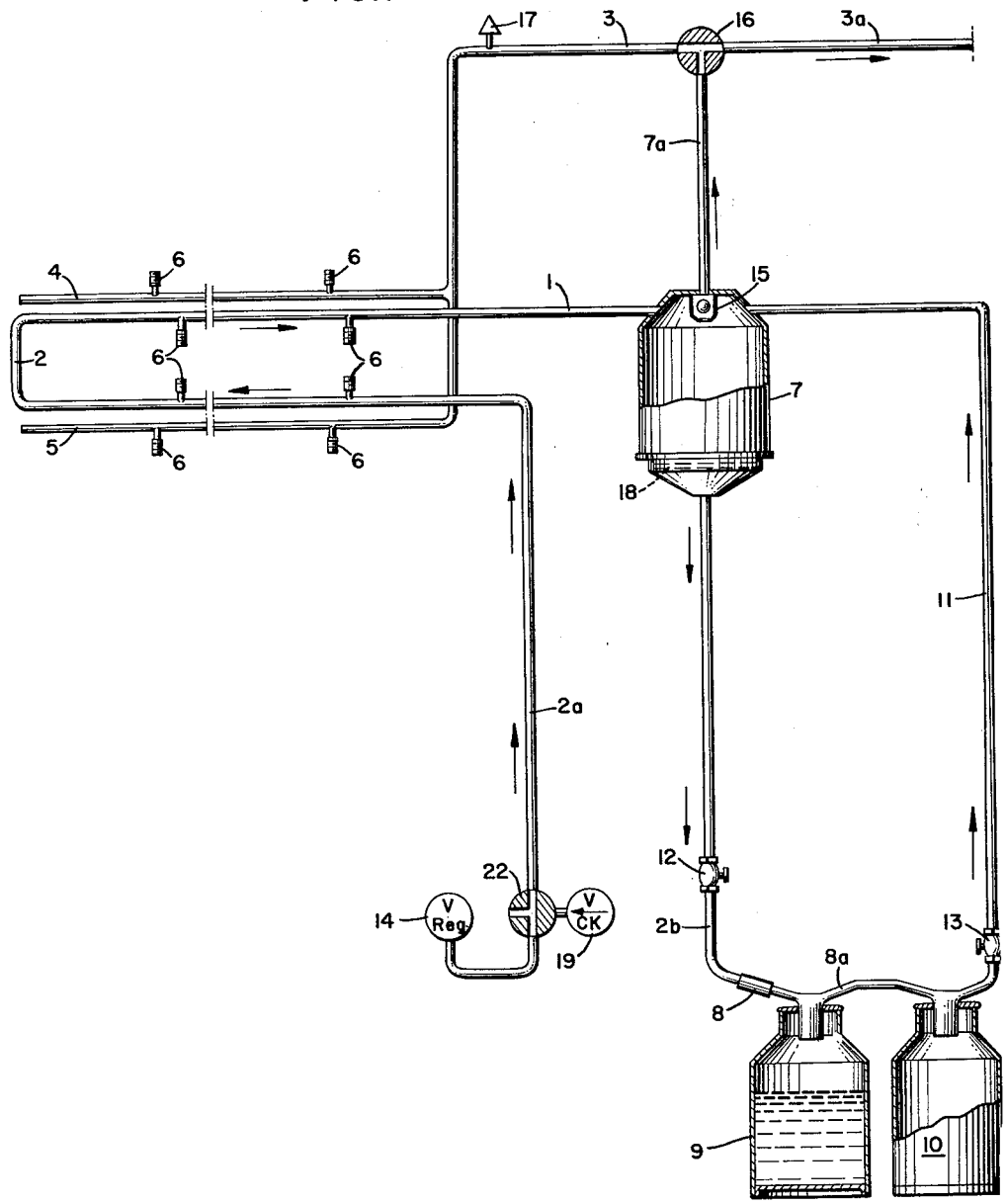

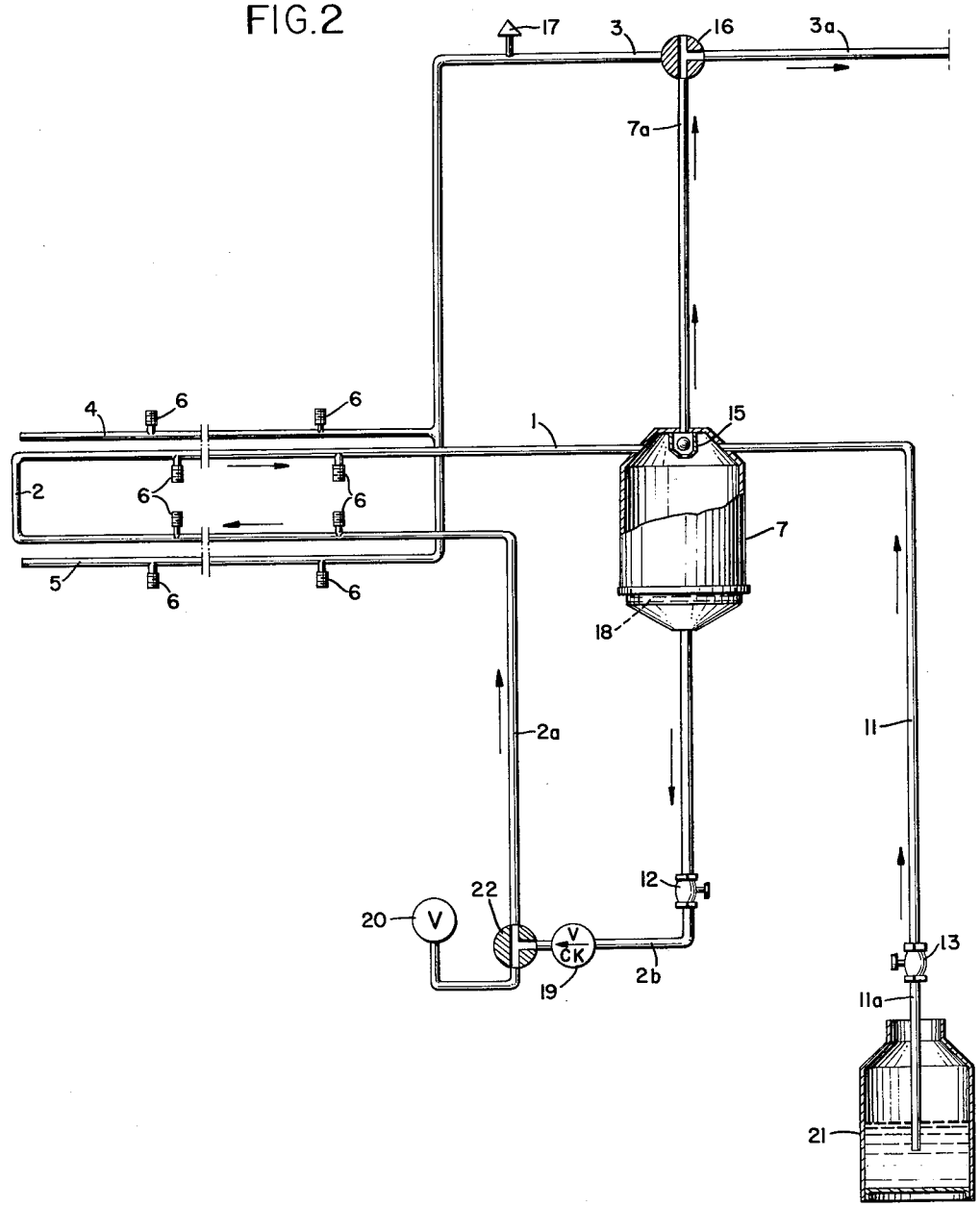

3,099,277
FLUSHING APPARATUS FOR MILKING SYSTEMS
Wäino Mäehans, Sodertalje, Sweden, assignor to Aktiebolaget Separator, Stockholm, Sweden, a corporation of Sweden
Filed Feb. 24, 1960, Ser. No. 10,746
Claims priority, application Sweden Mar. 2, 1959
8 Claims. (Cl. 134—166)

This invention relates to vacuum milking systems and more particularly to an improved system of this character in which the milk pipe line can be cleaned in a simple and efficient manner.

Large milking installations are made as so-called pipe line milking plants. In these plants, the milk is fed from the various milking points into a common milk pipe line and is conveyed under vacuum through the pipe line to one or more collecting vessels in a separate room. The pipe line milking plants are of two different types. In one, the milk is discharged from the vacuum system by means of a so-called releaser, which sluices the milk from the system. Plants of this type are therefore called releaser plants. In these the milk runs from the sluice device down into open collecting vessels. In the other type of pipe line milking plant, the collecting vessels are directly connected to the milk pipe line and are under vacuum while being filled. This totally closed system has certain advantages over the releaser system. First and foremost, the apparatus required is comparatively simple and cheap. However, washing or cleaning of the pipe line entails a certain complication.

In releaser-type plants, cleaning of the pipe line system is normally effected by means of washing liquid which, with or without supply of air, is sucked into the milk pipe line from an open vat to which the washing liquid is then sluiced back through the releaser. In this way, a circulation of the washing liquid is obtained through the pipe line. In large-size releaser plants, the cleaning is often effected by flushing with washing liquid under pressure; that is, the washing liquid is pumped through the pipe line system.

In plants having a totally closed system, it is necessary, for efficient cleaning by circulating a limited quantity of washing liquid, to insert a so-called washing-releaser, which means using essentially the same method as when washing a plant of the releaser type. This in itself involves an undesired complication.

An object of the present invention is to provide a vacuum milking system of the totally closed type which overcomes the above-noted disadvantage in the cleaning of such systems.

The milking system of the present invention has a milk pipe line through which the milk is conveyed under vacuum from the milking point directly to one or more collecting vessels, likewise under vacuum. A container forming a milk separating device is inserted in the milk pipe line, and the milk with accompanying air enters the upper part of this container, the milk being discharged separately from the lower part of the container toward the collecting vessel. According to the invention, efficient cleaning by circulating a limited quantity of washing liquid through the milk pipe line is made possible by the fact that one end of the milk pipe line, the discharge end connected to the collecting vessel, and the other end of the milk pipe line, the initial end, are arranged so that they can be connected with each other through a non-return valve preventing backward flow in the milk pipe line; and an air inlet valve is connected to the initial end of the milk pipe line and admits atmospheric air, preferably intermittently, into the milk pipe line when its ends are connected with each other.

For a better understanding of the invention, reference may be had to the accompanying drawings, in which:

FIG. 1 is a schematic view of a preferred form of the new milking system as it appears during the milking operation, and FIG. 2 is a view similar to FIG. 1 but showing the system ready for the washing operation.

The milking system as illustrated comprises a milk pipe line 1 having an intermediate portion 2 forming a loop extending along the milking area where the cow stalls are located. A vacuum pipe line 3 has an end portion 3a connected to a vacuum pump (not shown) and forms two branch lines 4 and 5 extending along parts of the loop 2. The pipes 2, 4 and 5 are provided with the usual sockets or fittings 6 for connection with the hoses of the milking units (not shown) required for the milking. As is common in vacuum milking systems, each milking unit includes a teat cup assembly and has a vacuum hose for connection to a fitting 6 on the vacuum pipe 4 or 5 and a milk hose for connection to a fitting 6 on the intermediate portion 2 of the milk pipe line 1. The latter has an initial end portion 2a and a discharge end portion 2b. As is well known in the art, each milking unit also includes a pulsator connected to the vacuum hose and serving to apply a vacuum and atmospheric pressure alternately to the spaces between the inflations and the shells of the corresponding teat cup assembly.

A container 7 forming a milk separating device is inserted in the milk pipe line 1 between its intermediate portion 2, which opens into the upper part of the container, and the discharge end portion 2b which leads from the bottom of the container. The upper part of the container 7 is also connected by a pipe 7a to the vacuum pipe line 3. Thus, milk from the cows, together with air mixed with the milk, enters the upper part of container 7, while the milk separated from the air discharges through the lower part of the container. During the milking, the discharge end 2b of the milk pipe line is connected through a releasable coupling 8 to a can-filling attachment 8a which connects two transport cans 9 and 10 in series through their respective covers (FIG. 1). An evacuation pipe 11 connects the can interiors through fitting 8a to the upper part of the container 7 so that the milk from this container runs down into the transport cans by gravity. The two lines 2b and 11 connected with the transport cans 9, 10 are provided with shut-off valves 12 and 13, respectively. In the initial end 2a of the milk line, which preferably is located near its discharge end 2b, is a vacuum valve 14 through which air is let into the milk pipe line in order to facilitate the flow of the milk. As indicated in FIG. 1, valve 14 is essentially a regulating valve of the type which automatically maintains substantially constant vacuum in the milk pipe line by admitting air into it when the vacuum exceeds a certain limit. The container or milk separating device 7 is connected through a float-valve 15, the pipe 7a and a three-way cock 16 to the vacuum line 3 in which there is also a vacuum valve 17 for regulation of the underpressure in the vacuum line. As pointed out hereinafter, the float-valve 15 serves to prevent the entrance of liquid from container 7 into vacuum line 3; and it may be of any form commonly used for this purpose, such as a ball element retained in a cage but free to float upwardly with a rising liquid level and thus close the lower end of pipe 7a. During the milking, the three-way cock 16 connects the container 7 as well as the branch pipes 4 and 5 of the vacuum line 3 to the vacuum pump (not shown). In the milk separating device or container 7 is a strainer 18.

When cleaning the milk pipe line after the milking is completed, the initial and final end portions 2a—2b of the milk pipe line are interconnected, as appears from FIG. 2, through a non-return valve 19. The latter may be permanently connected to the initial end portion 2a of the milk line through a three-way cock 22 which, during milking, is positioned as shown in FIG. 1, so that only the vacuum valve 14 opens into the initial end portion 2a. When the milk pipe line is to be cleaned, the cock 22 is turned to the position shown in FIG. 2, so that the discharge end portion 2b also opens into the initial end portion 2a, after detaching the portion 2b from coupling 8 and attaching it to the check valve 19. Also, the vacuum valve 14 is replaced by an air inlet valve in the form of a pulsator valve 20 connected to the initial end of the milk pipe line. The pulsator valve 20, which may be of conventional design, automatically admits atmospheric air, periodically or intermittently, into the milk pipe line. A suitable pulsator valve 20 is described and illustrated at 10 in U.S. Patent No. 2,818,076, dated December 31, 1957. Finally, the valve 13 is disconnected from the can-filling attachment 8a and is connected through a line 11a with an open vessel 21 containing a washing and disinfecting agent. The valves 12—13 are closed after the milking operation and while preparing for the cleaning or flushing operation.

Before the flushing begins, the valve 13 is opened, and a suitable quantity of washing liquid is drawn from the vessel 21 through line 11 to the container 7, the cock 16 being positioned as shown in FIG. 2. The float valve 15 prevents washing liquid from entering the vacuum line 3 and penetrating to the vacuum pump. When a suitable quantity of washing liquid has been sucked into the container or milk separating device 7, the valve 13 is closed and the valve 12 is opened, whereupon the liquid in that part of the milk pipe line 2a which extends upward from the non-return valve 19 and cock 22 adjusts itself to the same level as the liquid in the container 7 without hindrance from the non-return valve 19. The air admitted through the pulsator valve 20 rapidly carries away the liquid contained in the above-mentioned part of the milk pipe line and conveys it through the loop 2 and back to the container 7, since the non-return valve 19 prevents flow in the opposite direction. As soon as the pulsator valve 20 has closed, a fresh quantity of washing liquid is led from the container or milk separating device 7 past the non-return valve 19 into the initial end of the milk pipe-line. This liquid, in turn, is picked up by the next quantity of air admitted through valve 20. By adjusting the height of the cock 22 in relation to the level of the washing liquid in the container 7, it is possible to adjust the size of the liquid quantity which, each time the pulsator valve 20 opens, is carried away through the milk pipe line. Further, by adjusting the frequency of the air admissions through the pulsator valve 20, it is possible to vary the quantity of washing liquid which is required for cleaning the milk pipe line and to adjust it so that only a very small quantity of washing liquid is required in container 7 each time the milk pipe line is to be cleaned. The air admitted through the pulsator valve 20 is mixed very intimately with the washing liquid in the milk pipe line and, with this liquid, forms plugs or stoppers which move very rapidly through the milk pipe line, whereby an efficient cleaning of the milk pipe line is obtained without requiring that it be completely filled with washing liquid. When the flushing is finished, the discharge end 2b of the milk pipe line is disconnected from the non-return valve 19, whereupon the washing liquid may be discharged through the bottom outlet from the container 7 after the underpressure in the system has been removed. In order that the container 7 may also be cleaned efficiently, it is advisable that the milk pipe line open into the upper part of this container tangentially, so that the flushing liquid is caused to rotate in the container 7 and flow down the inside of its walls. The cylindrical part of the container 7 is preferably made of transparent material so that it can be determined quickly when a sufficient quantity of washing liquid from the container 21 has been drawn into the container 7.

I claim:

1. In combination with a liquid pipe line having an initial end portion, an intermediate portion adapted for connection to a milking unit and to receive milk therefrom, and a discharge end portion for delivering liquid from said intermediate portion, and a vacuum pipe line adapted for connection to said discharge end portion to maintain it under vacuum, a closed container located in the liquid pipe line and forming a liquid separating device, said intermediate portion of the pipe line leading into the upper part of the container, and said discharge end portion forming an air-tight flow path leading from the lower part of the container, means for connecting the upper part of the container to the vacuum pipe line, an air inlet pulsating valve connected to said initial end portion for admitting air intermittently into the liquid pipe line, and means including a check valve for connecting said discharge end portion of the liquid pipe line to said initial end portion at a point between said inlet valve and said intermediate portion, the check valve having an air-tight flow connection with said initial end portion and thereby permitting flow only in the direction from the container through said discharge end portion to said initial end portion, whereby washing liquid from said container can be circulated in admixture with air through the intermediate portion of the liquid pipe line and back to the container.

2. A combination according to claim 1, in which said inlet valve is a pulsator valve.

3. A combination according to claim 1, comprising also a conduit leading into the upper part of said container and adapted for insertion in a body of washing liquid to draw liquid into said container under vacuum.

4. A combination according to claim 1, comprising also a conduit leading into the upper part of said container and adapted for insertion in a body of washing liquid to draw liquid into said container under vacuum, and a valve in said conduit.

5. A combination according to claim 1, in which said point of said initial end portion of the liquid pipe line is at a level at least as low as the lower part of said container.

6. A combination according to claim 1, in which said point of said initial end portion of the liquid pipe line is at a level at least as low as the lower part of said container, said initial end portion extending upwardly from said point toward said intermediate portion.

7. A combination according to claim 1, comprising also a valve in said discharge end portion of the liquid pipe line.

8. A combination according to claim 1, in which the vacuum pipe line has a first portion extending in proximity to said intermediate portion of the liquid pipe line and provided with means for connection to said milking unit, the vacuum pipe line also having a second portion for connection to a vacuum source, said means for connecting the upper part of said container to the vacuum pipe line including a valve located between said first and second portions and operable selectively to connect said second portion to the container while disconnecting said second portion from said first portion, and to connect said second portion simultaneously to both the container and said first portion.

References Cited in the file of this patent

UNITED STATES PATENTS

| | | |
|---|---|---|
| 2,680,445 | Hemminger | June 8, 1954 |
| 2,680,553 | Hein | June 8, 1954 |
| 2,708,448 | Reeve | May 17, 1955 |
| 2,794,420 | Recchia | June 4, 1957 |
| 2,800,134 | Merritt | July 23, 1957 |

FOREIGN PATENTS

| | | |
|---|---|---|
| 696,507 | Great Britain | Sept. 2, 1953 |